June 8, 1937.  R. G. TURNER  2,082,918
MEANS TO PREVENT VIBRATION OF SHUTTLE BOX FORMING ELEMENTS
Filed Dec. 30, 1935
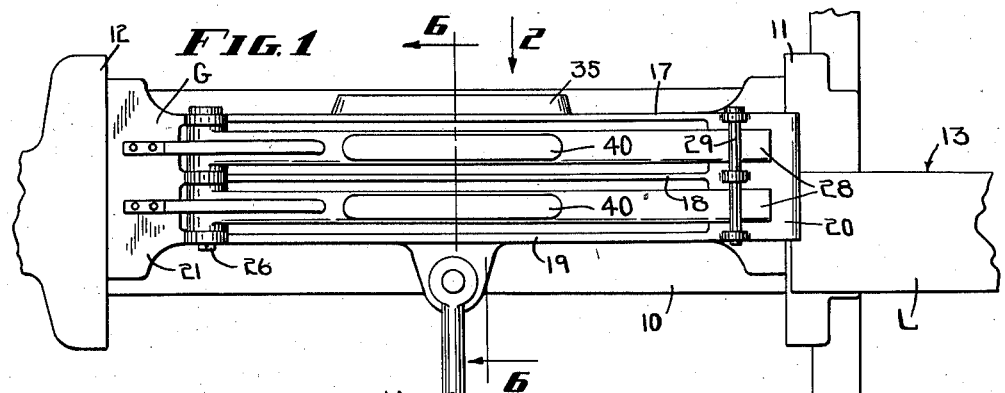
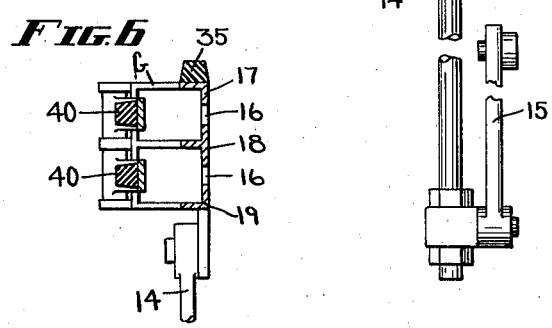
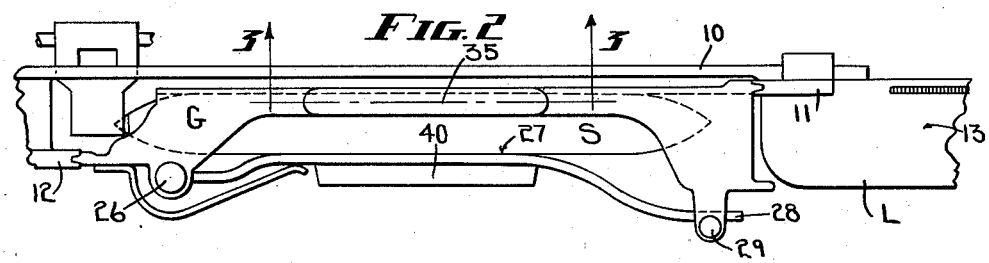
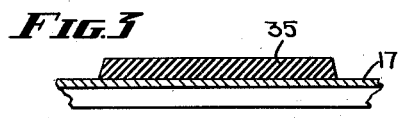
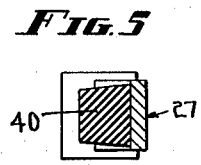
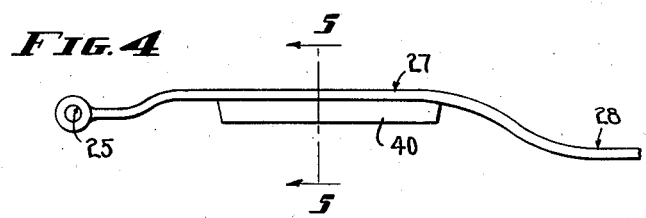
Inventor
Richard Greenleaf Turner
Attorneys Patented June 8, 1937

2,082,918

UNITED STATES PATENT OFFICE 2,082,918

MEANS TO PREVENT VIBRATION OF SHUTTLE BOX FORMING ELEMENTS

Richard Greenleaf Turner, Worcester, Mass., assignor to Crompton & Knowles Loom Works, Worcester, Mass., a corporation of Massachusetts Application December 30, 1935, Serial No. 56,712

3 Claims. (Cl. 139—183)

This invention relates to improvements in shuttle box forming elements and it is the general object of the invention to provide means for reducing breakage of these elements due to internal strains and vibration incident to high speed.

With the present tendency to operate looms at higher speeds than formerly it is found that the shuttle boxes and their binders are subject to an increased vibration the effect of which sets up internal strains causing fracture. Because of these increased speeds the boxes will start their shifting movement at a quicker rate and the force thus imparted to them causes certain parts to move faster than others, tending to set up vibration which causes relative changes in the internal structure of the metal of which the boxes are made. In a similar way, the higher speed of the shuttle causes increased internal stresses in the binder. In order to meet this condition it has been common practice to add metal, thereby increasing the weight of moving parts on the lay. This is an undesirable condition inasmuch as moving parts should be as light as possible and if their speeds are to be increased the weight should preferably be reduced.

The shuttle boxes and binders are relatively long slender structures and it is an important object of my present invention to mount a shock absorbing material, such as rubber, on those parts of the boxes and binders where the amplitude of vibration is likely to be a maximum. It is found incidentally that the noise attending boxing of the shuttle is very greatly reduced. A binder for instance made in the usual way when struck a hammer blow gives a high pitch sound, but when the rubber block is added the sound is greatly reduced.

It is desirable that the rubber or similar material have close and intimate relation with the box forming element or binder and to attain this result it is another object of my invention to cement the damping material in place, although rivets or screws may be used additionally to check initial separation between the dampener and the part to which it is applied. I do not wish, however, to be limited to any particular way of securing the damping material in place, but suggest cementing as one form which has given satisfactory results.

With these and other objects in view which will appear as the description proceeds, my invention resides in the combination and arrangement of parts as hereinafter set forth and described.

In the accompanying drawing, wherein a convenient embodiment of my invention is set forth, Fig. 1 is an end elevation of the drop box end of the loom having my invention applied thereto, Fig. 2 is a top plan view of the shuttle boxes taken in the direction of arrow 2, Fig. 1, Fig. 3 is a vertical section on line 3—3 of Fig. 2, Fig. 4 is a plan view of the binder, Fig. 5 is a vertical transverse section on line 5—5, Fig. 4, and Fig. 6 is a vertical section on line 6—6 of Fig. 1.

Referring to Fig. 1, the lay L has a lay end 10 secured thereto having inner and outer guides 11 and 12, respectively, for a gang of shuttle boxes G. In the present instance I show two cells in the gang of boxes, each of which is movable to active position relative to the shuttle race 13 by means of a box lifter rod 14 operated by a lifter link 15. The latter may be actuated by any of the known box motions and acts for instance during the rising of the boxes to impart a lifting force along a more or less central line with respect of the length of the boxes, as suggested in Fig. 1. As shown in Fig. 6 the back of the boxes has longitudinal slots 16 for the picker not shown, the gang of boxes having the longitudinally extending sections 17, 18, and 19 separated by the slots. The sections are connected at their inner and outer ends by cross webs 20 and 21, respectively.

When the box rod 14 moves quickly as is the case in high speed looms the center of the bottom section 19 starts upwardly before the end webs, and then the latter due to the resilience of the bottom web will rise and overrun their normal position relatively to the bottom web. This sets up vibration which causes internal friction in the metal of the box. This condition exists for practically all of the elongated sections of the box.

The binder shown in Fig. 4 may have a bearing 25 for the pivot pin 26 carried by the gang of boxes and said binder will ordinarily be made of metal, either malleable iron or steel and have an inner polished shuttle engaging surface 27 which leads to an inner end 28 to cooperate with a stop pin 29 against which the end 28 moves when the shuttle S is boxed. While I have illustrated one contour of binder in Fig. 4, yet I do not wish necessarily to be limited in this way since, the invention is applicable to binders having a variety of shapes.

The shuttle boxes and binders of themselves form no part of my present invention and may be of the usual construction, being made of thin metal sections which are subject to vibration during high speed loom operation.

In applying my invention to the shuttle box structure I provide a block of relatively stiff but elastic material 35, this material being rubber in one form of the invention. The block is cemented tightly to the top of section 17, as indicated along line 36. It is desirable that the surface of the section 17 to which the rubber is to be applied be clean so that the vibrations can be transferred from a metallic surface to the rubber cushion over the greatest area possible.

When the invention is applied to the binder I cement a similar block of rubber 40 to the front of the binder preferably along the central part thereof, since it is in this region that the amplitude of vibration is likely to be greatest. Block 40 is secured to the binder in much the same way as is the block 35 to the shuttle box section 17.

The blocks 35 and 40 should have relatively large dimensions in directions parallel to the vibrational movements, as suggested in Figs. 3 and 5. While the block has been shown in a specific position in Figs. 2 and 3, yet I do not wish to be limited to these locations, nor to the use of a single block.

In the operation of a loom equipped with my invention I find that the noise incident to the boxing of a shuttle is very materially reduced, thereby indicating that vibration is lessened, a condition which is favorable to increased life of the box forming element. I find also that because of the lessened vibration it is possible to form a binder and boxes of thinner sections, thus creating a condition favorable to increased speeds.

In considering the manner in which my invention operates the relation between the vibration of the metallic section together with the damping action of the rubber or its equivalent may be thought of as operating in two ways. The first half of a complete vibration will result in moving a surface carrying the damping element toward the latter while the second part of the vibration carries the surface in a direction away from the element. When having the first of these motions the rubber or its equivalent will be placed under tension tending therefore to resist the degree of this first motion; while during the second motion which carries the surface on the other side of its normal static position the mass of rubber will be compressed. Both halves of the vibration will therefore be checked by stresses in the rubber which alternate between tension and compression, these internal strains in the rubber increasing with the amount of vibration so that the greater the need for checking the greater the checking force will be exerted by the rubber. Another consideration grows out of the fact that the mass of rubber has its own resonance or period of vibration, and since by its nature it possesses a much lower modulus of elasticity than the metal section its period of vibration will be slower and the resultant vibration of the binder or box section as a whole will be lowered because of the difference in resonating periods, the rubber being proportioned so that its period is not a partial of the primary period of the metal section.

While I have specifically shown rubber and have set forth definite proportions between the mass of rubber and the part to which it is applied in the drawing yet I do not wish necessarily to be limited to this material or the suggested proportions. I find that it is desirable, however, to have the block large enough so that it will present a considerable dimension in the plane of vibration. Referring to Figs. 3 and 5 for instance the vibrations will be in a vertical direction and the body of rubber should therefore have a considerable dimension in this direction.

Having thus described my invention it will be seen that changes and modifications may be made therein by those skilled in the art without departing from the spirit and scope of the invention and I do not wish to be limited to the details herein disclosed, but what I claim is:

1. In a loom, a lay, a set of metallic shifting shuttle boxes mounted on the lay, a box lifter rod connected to the underside of the set of boxes to effect vertical movement of the boxes relatively to the lay, a horizontally extending element forming part of the set of boxes near the upper part of the latter and a block of inherently resilient material secured to said element on the side thereof remote from the box lifter rod, the block of resilient material acting by reason of its inherent resilience to reduce vibration of the upper part of the set of shifting boxes remote from the box lifter rod.

2. In a loom, a lay, a gang of metallic shifting shuttle boxes supported by the lay, a box lifter rod attached to the underside of the gang to move the latter vertically with respect to the lay and a body of non-metallic shock absorbing material secured to the upper part of the gang at a location remote from the box lifter rod, said body of material acting to reduce vibration in that part of the gang remote from the box lifter rod.

3. In a loom, a lay, a set of metallic shuttle boxes, a horizontal bottom element for the set, a horizontal top element for the top box of the set, a box lifter rod connected to the first element and capable of shifting the set vertically with respect to the lay, and a body of rubber secured to the second named element at a location remote from the box lifter rod, said rubber acting by reason of its inherent resilience to reduce vibration of the upper part of the set which is caused by action of the box lifter rod when causing vertical shifting of the boxes.

RICHARD GREENLEAF TURNER.